United States Patent Office 3,732,300
Patented May 8, 1973

3,732,300
PHENYLAMINOETHANOL DERIVATIVES
Lawrence H. C. Lunts and Paul Toon, Bethnal Green, England, assignors to Allen and Hanburys Limited, London, England
No Drawing. Original application Sept. 20, 1967, Ser. No. 669,263, now Patent No. 3,644,353. Divided and this application May 11, 1971, Ser. No. 142,367
Claims priority, application Great Britain, Sept. 23, 1966, 42,590/66
Int. Cl. C07c 103/26
U.S. Cl. 260—559 S    8 Claims

ABSTRACT OF THE DISCLOSURE

Novel 1-phenyl-2-amino ethanol derivatives of the formula:

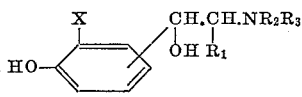

are disclosed. Some have stimulant action and some have blocking action on β-adrenergic receptors. 5-(2-tert.-butylamino-hydroxyethyl)-salicylamide in particular exerts a marked blocking effect while being remarkably non-toxic and free from central nervous depressant activity.

---

This application is a division of copending application Ser. No. 669,263, filed on Sept. 20, 1967, now U.S. Pat. 3,644,353.

This invention relates to novel 1-phenyl-2-aminoethanol derivatives having biological activity, and to compositions containing the same.

The present invention provides compounds of the general formula:

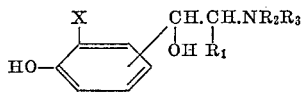

and physiologically acceptable acid addition salts thereof, in which:

$R_1$ represents a hydrogen atom or a straight or branched chain alkyl radical containing from 1 to 6 carbon atoms;

$R_2$ represents a hydrogen atom, or a benzyl group;

$R_3$ represents a hydrogen atom, or a straight or branched chain alkyl radical containing from 1 to 6 carbon atoms which radical may be substituted by hydroxyl groups, amino groups or heterocyclic rings, containing one or more heteroatoms, for example morpholino, or represents a cycloalkyl, aralkyl or aryloxyalkyl radical which radicals may optionally be substituted for example by one or more alkoxy or hydroxy groups; and X represents a hydroxyalkyl or hydroxyaralkyl radical having a straight or branched alkyl chain containing from 1 to 6 carbon atoms, or a carboxyl radical, or an alkoxycarbonyl radical of the formula —$COOR_4$ (where $R_4$ represents a straight or branched chain alkyl radical containing from 1 to 6 carbon atoms), or represents a radical of the formula —CONHOH or —$CONHNH_2$ or an amido radical of the formula —$CONR_5R_6$ (where $R_5$ and $R_6$, which may be the same or different, each represent a hydrogen atom or an arylalkyl radical or a straight or branched chain alkyl radical containing from 1 to 6 carbon atoms which may be substituted by hydroxyl or amino groups or where $R_5$ and $R_6$ together with the adjacent nitrogen atom form a heterocyclic ring which may contain additional hetero atoms).

As the compounds of general Formula I possess at least one asymmetric carbon atom, the invention also includes all the possible optically active forms and racemic mixtures of the compounds. The racemic mixtures may be resolved by conventional methods, for example, by salt formation with an optically active acid, followed by fractional crystallisation. Those compounds in which the side chain substituent is para to the phenolic hydroxyl group or para to substituent X are preferred.

The compounds of the invention possess either stimulant or blocking actions on β-adrenergic receptors. Compounds which have a stimulant effect on β-adrenergic receptors are used mainly as broncho-dilators. However, known β-adrenergic stimulants, for example isoprenaline, which is 3,4-dihydroxy-α-(isopropylaminomethyl) benzyl alcohol

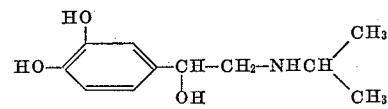

also affect the heart, and are potent cardiac stimulators at effective bronchodilator doses. The compounds of the invention which possess stimulant activity on β-adrenergic receptors have been found to exert a more selective effect on bronchial muscle so that bronchodilation is possible without excessive cardiac stimulation. For example, the compound $\alpha^1$-tert.-butylaminomethyl - 4 - hydroxy-m-xylene-$\alpha^1,\alpha^3$-diol (AH 3365) has been tested on asthmatic patients and it was found that 100 μg., doses of this compound given by aerosol, are at least equal in speed of onset and intensity of action to isoprenaline at the same dose, and it is longer acting than isoprenaline. It was also found that AH 3365 did not affect the pulse rate or blood pressure at four times the effective dose whereas isoprenaline had a marked effect on both measurements, as shown in Table I below. In contrast to isoprenaline which is poorly active when given orally, AH 3365 has been found to be an effective bronchodilator in human beings after oral administration again without obvious cardiovascular actions.

TABLE I

Changes in heart rate and pulse-pressure after administration of AH 3365 and isoprenaline by aerosol. Mean of 6 subjects

|  | 5 minutes | | 10 minutes | | 15 minutes | | 20 minutes | |
|---|---|---|---|---|---|---|---|---|
|  | Pulse rate per min. | Pulse pressure, mm. Hg | Pulse rate per min. | Pulse pressure, mm. Hg | Pulse rate per min. | Pulse pressure, mm. Hg | Pulse rate per min. | Pulse pressure, mm. Hg |
| AH 3365, 200 μg | −1(±1) | −0.5(±2.1) | −5(±1) | −3(±2.9) | | | −6(±1) | −4(±2.2) |
| AH 3365, 400 μg | −2(±1) | 1.5(±2.2) | −4(±1) | −1(±1.9) | | | −4(±1) | −1(±1.7) |
| Isoprenaline, 200 μg | +19(±6) | +27.5(±3.8) | +6(±2) | +11(±2.6) | +(±2) | +3.5(±2.3) | | |

Amongst the other compounds of the invention which were found to possess β-adrenergic stimulant activity are those given below:

4-hydroxy-$\alpha^1$-isopropylaminomethyl-m-xylene-$\alpha^1,\alpha^3$-diol.

$\alpha^1$-(cyclopentylaminomethyl)-4-hydroxy-m-xylene-$\alpha^1,\alpha^3$-diol.

4-hydroxy-$\alpha^1$-(1-isopropylaminopropyl)-m-xylene-$\alpha^1,\alpha^3$-diol.

4-hydroxy-$\alpha^1$-[(2-indol-3-y-1-methylethyl)amino]methyl-m-xylene-$\alpha^1,\alpha^3$-diol.

4-hydroxy-$\alpha^1$-{[(-methyl-2-phenoxyethyl)amino]methyl}-m-xylene-$\alpha^1,\alpha^3$-diol.

4-hydroxy-$\alpha^1$-{[(p-methoxy-$\alpha$-methylphenethyl)amino]methyl}-m-xylene-$\alpha^1,\alpha^3$-diol.

4-hydroxy-$\alpha^1$-[(p-hydroxy-$\alpha$-methyl phenethyl-amino)methyl]-m-xylene-$\alpha^1,\alpha^3$-diol.

4-hydroxy-$\alpha^1${[(1-methyl-2-morpholinoethyl)amino]methyl}-m-xylene-$\alpha^1,\alpha^3$-diol.

These compounds were tested in anaesthetised guinea pigs for the ability to relieve bronchospasm induced by the injection of acetylcholine, 5-hydroxy-tryptamine, bradykinin and histamine.

Other uses for the compounds of the invention which possess β-adrenergic stimulant activity may include the treatment of glaucoma, and also the control of gastric acid secretion in the treatment of peptic ulceration. The cardiovascular side-effects of known β-adrenergic stimulants limit their usefulness in these cases.

The compounds of the invention which possess blocking activities on β-adrenergic receptors are of use in the treatment or prophylaxis of cardiovascular disorders, for example, arrhythmias, coronary heart disease, angina pectoris and hypertension. Known β-adrenergic blocking agents have undesirable side effects, for example 3,4-dichloro-α-(isopropylaminomethyl) benzyl alcohol possesses potent sympathomimetic effects, and propranolol, 1-isopropyl-amino-3-(1-naphthyloxy)-propan-2-ol affects the central nervous system. The compounds of the invention however are virtually devoid of these side effects.

For example, the compound 5-(2-tert.-butyl-amino-1-hydroxyethyl)-salicylamide, when tested in conscious dogs, was found to be slightly less active than propranolol in reducing the tachycardia produced by the intravenous injection of isoprenaline. At 0.5 mg./kg., for example, the compound given orally produced a 50–60% block of the isoprenaline response, whilst propranolol at the same dose level produced a 70–80% block, the duration of action of the two compounds being similar. However, in neuropharmacological tests, the compound was found to be remarkably non-toxic, and free from central nervous depressant activity. For example, in mice, it produced only negligible behavioural effects at doses up to 400 mg./kg. administered orally, whereas animals treated with propranolol showed signs of depression at doses of 100 mg./kg. and at 400 mg./kg. the drug caused very severe and widespread central depression.

Amongst the other compounds of the invention which were found to possess β-adrenergic blocking activity when tested for the ability to inhibit the tachycardia produced by the intravenous injection of isoprenaline in anaesthetised dogs, are to be mentioned the following:

5-(1-hydroxy-2-isopropylaminoethyl)-salicylic acid methylester.

5-(2-amino-1-hydroxyethyl)-salicylic acid methyl ester.

5-(1-hydroxy-2-isopropylaminoethyl)-salicylamide.

5-(1-hydroxy-2-[(1-methyl-2-phenoxyethyl)amino]ethyl) salicylamide.

5-(1-hydroxy-2-isopropylaminoethyl)-N-methyl-salicylamide.

$\alpha^1$-(benzyl-tert-butylaminomethyl)-4-hydroxy-m-xylene-$\alpha^1,\alpha^3$-diol.

N-benzyl-5-(1-hydroxy-2-isopropylaminoethyl)-salicylamide.

5-[1-hydroxy-2-(p-methoxy-α-methylphenethyl)amino ethyl]-salicylic acid methyl ester.

5-[1-hydroxy-2-(isopropylamino)-butyl] salicylamide.

4[1-hydroxy-2-(isopropylamino)ethyl]salicyclic acid methyl ester.

Specific preferred compounds according to the invention are those specifically referred to above.

The compounds according to the invention may be formulated for use in human or veterinary medicine for therapeutic and prophylactic purposes. They will in general be used in the form of their physiologically acceptable salts. Preferred salts include the hydrochloride, sulphate, maleate, tartrate, citrate, etc.

The invention therefore includes within its scope pharmaceutical compositions containing as active ingredients 1-phenyl-2-aminoethanol derivatives of the general Formula I, or physiologically acceptable acid addition salts thereof. Such compounds may be presented for use in a conventional manner with the aid of carriers or excipients and formulatory agents as required, and with or without supplementary medicinal agents.

The compositions may include for instance solid and liquid preparations for oral use, suppositories, injections, or in a form suitable for administration by inhalation.

Oral administration is most convenient in the form of tablets which may be prepared according to conventional methods, and may be coated if required. Soluble tablets suitable for sublingual administration may also be used.

Injections may be formulated with the aid of physiologically acceptable carriers and agents as solutions, suspensions or as dry products for reconstitution before use.

For administration by inhalation the compositions according to the invention are conveniently in the form of an aerosol spray presentation.

The dosage at which the active ingredients are administered may vary within a wide range and will depend on whether their activity is as a β-adrenergic stimulant or as a β-adrenergic blocker. A suitable oral dosage range for the stimulants is generally from 1 to 100 mg. and for the blockers 50 to 1000 mg. The pharmaceutical compositions may with advantage be formulated to provide a dose within this range either as a single unit or a number of units.

In the use of an aerosol for bronchodilatation the dosage unit may be determined by providing a metering valve in the aerosol pack so that it delivers a metered amount on use. Such a metered amount may be of the order of 50–1000 μg.

The compounds according to the invention may be prepared by a number of processes which at some stage involve the reduction of the corresponding ketone to the alcohol.

The invention therefore provides a process for the preparation of compounds of the general Formula I herein which comprises reducing the carbonyl group

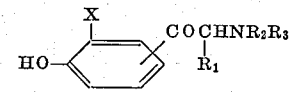

of a ketone of the above general formula to an alcoholic group in which X, $R_1$, $R_2$ and $R_3$ have the meanings given herein or are groups convertible thereto, if desired with protection of the phenolic hydroxy group, the product if desired being isolated in the form of a physiologically acceptable acid addition salt.

In one method of preparation compounds of the general Formula I are prepared by a process which comprises converting the methoxycarbonyl group of the ketone of the general Formula II (X=CO$_2$Me)

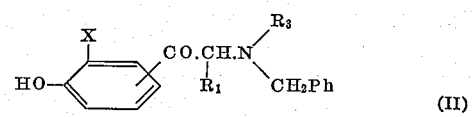

(II)

in which $R_1$ and $R_3$ have the meaning given above, by conventional methods to any of the other radicals represented by X in Formula I, either directly, or after reduction of the carbonyl group to the alcohol with suitable hydrides for example sodium borohydride, or lithium aluminium hydride. If desired the N-benzyl group may then be removed by catalytic hydrogenolysis. Alternatively reduction of the carbonyl group and removal of the N-benzyl group can be effected in one stage by hydrogen and a noble metal catalyst. In some reactions, it may be advantageous to protect the phenol group e.g. as a benzyl ether or an acetate. The protecting group may be removed by hydrogenolysis or hydrolysis to give the required product. Compounds in which $R_2$ and $R_3$ both represent hydrogen atoms may be prepared from the dibenzyl amino compound by catalytic hydrogenation.

Another subsequent conversion envisaged by the invention is the reaction of the group COOMe to a tertiary alcohol by reaction with a Grignard reagent.

The 1-phenyl-2-aminoethanol derivatives of the general Formula I in which X is an alkoxycarbonyl radical of the general Formula —COOR$_4$, where R$_4$ has the meaning given above may be prepared by reacting the ketone of Formula II (X=CO$_2$H) with an alcohol of the general formula R$_4$OH, in the presence of an acid catalyst, followed by catalytic hydrogenolysis, to give the 1-phenyl-2-aminoethanol derivative.

The compounds of the invention in which X is a hydroxymethyl group may be prepared by reduction of the ester group —CO$_2$Me, for example with lithium aluminium hydride, followed by catalytic hydrogenolysis, to the alcohol of general Formula I. It has been found that the addition of a volatile base to the reaction mixture minimises the hydrogenolysis of the —CH$_2$OH group during the catalytic reduction.

Compounds of the general Formula I in which X is a hydroxymethyl radical may also be prepared by other processes.

In the first of these processes a compound of the general Formula III, or a salt thereof

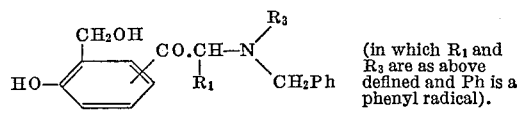

(in which R$_1$ and R$_3$ are as above defined and Ph is a phenyl radical).

is subjected to catalytic hydrogenation, preferably using a palladium oxide on charcoal catalyst to yield a compound of the general Formula IV.

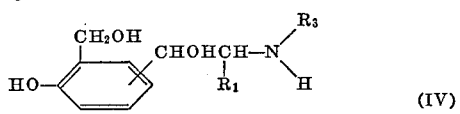

(IV)

Alternatively, the ketone of Formula III may be reduced with sodium borohydride to give the alcohol of general Formula V and this latter may also be obtained by reduction of a compound of Formula II (where X=alkoxycarbonyl) by the use of lithium aluminium hydride.

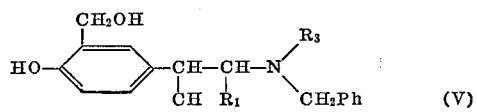

(V)

If desired this compound is then subjected to catalytic hydrogenation to remove the N-benzyl group, to produce a compound of Formula IV.

Use of the alcohol (V) in the hydrogenation instead of the ketone III minimises the side reaction in which the —CH$_2$OH group is reduced to a —CH$_3$ group. The ketone of the general Formula III can be prepared from the compound (VII, X=—CH$_2$OH) below in which the hydroxy groups can be protected by acetylation, by condensation with an amine of the general formula R$_2$R$_3$NH (where R$_2$ and R$_3$ have the meanings given above) and removal of protecting groups where these are present.

The compounds of Formula I in which X is a carboxyl group may be prepared by hydrolysis of the ester group of the ketone II (X=CO$_2$Me), for example with an acid catalyst, followed by catalytic hydrogenolysis to the 1-phenyl-2-aminoethanol derivative.

Compounds of Formula I in which X is an amide group of the general formula —CONR$_5$R$_6$, where R$_5$ and R$_6$ have the meanings given above, may be prepared by reacting the ketone II (X=CO$_2$R$_4$) or the alcohol derived from it by reduction with an amine of the general formula R$_5$R$_6$NH, where R$_4$, R$_5$ and R$_6$ have the meanings given above, followed by catalytic hydrogenolysis.

Compounds of the general Formula I in which X is a —CONHOH or CONHNH$_2$ radical may be prepared from the ketone of Formula II (X=CO$_2$R$_4$) by reducing it to the alcohol of general Formula I (X=CO$_2$R$_4$) in which R$_4$ has the meaning given above, and reacting this compound with hydroxylamine, NH$_2$OH or hydrazine NH$_2$NH$_2$ and removing the N-benzyl group to give the required product.

In an alternative process for the preparation of the 1-phenyl-2-aminoethanol derivatives of the invention, the secondary amine of the general Formula VI (X=CO$_2$Me) may be used in place of the ketone II, or alcohol I (X=CO$_2$Me), for the reactions given above in which the methoxycarbonyl group is converted to any of the other radicals represented by X in the general Formula I

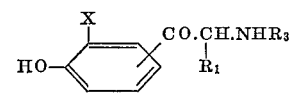

VI

The ketone of general Formula II may be prepared by the condensation of an amine R$_3$NH.CH$_2$Ph with a halogen derivative of general Formula VII

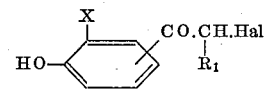

VII

The 1-phenyl-2-aminoethanol derivative of the general Formula I may also be prepared by the condensation of an amine of the general formula R$_2$R$_3$NH with a halohydrin of the general Formula VIII

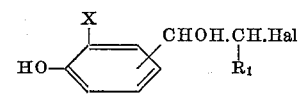

VIII

In a further process the compounds of Formula I may also be prepared by the reaction of an amine of the general formula R$_2$R$_3$NH with an epoxide of general Formula IX

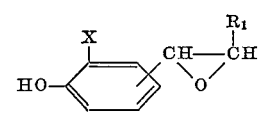

IX

In all of the above processes the phenolic group may be protected, e.g. as the benzyl ether.

In these formulae, R$_1$, R$_2$, R$_3$ and X have the meanings given above.

Compounds of the general Formula I in which X is a secondary or tertiary alcoholic group may be prepared via conversion of a compound of the Formula I in which in the X substituent position there is a halogen atom to an organometallic compound and reaction thereof with an aldehyde or ketone.

The following examples illustrate the invention.

EXAMPLE 1

Preparation of 5-(1-hydroxy-2-isopropylaminoethyl)-salicylamide hydrochloride (a) 5-(N-benzyl - N - isopropylglycyl)-salicylic acid methylester hydrochloride.—7.3 g. of N-benzylisopropylamine were added to a stirred solution of 7.5 g. of 5-bromoacetyl salicylic acid methyl ester in 100 ml. of methyl ethyl ketone. A colourless crystalline precipitate was observed at once but stirring and refluxing was continued for 2.5 hrs. After being allowed to stand at room temperature for 2 days the solvent was evaporated under reduced pressure and dry ether was added to the residual oil. The ethereal solution obtained was treated with dry hydrogen chloride gas to give 6 g. of the hydrochloride as an oily solid. Recrystallisation from methanol/ethyl-acetate gave 3.55 g. of the hydrochloride as a colourless powder, M.P. 168–170° C.

(b) 5-(N-benzyl-N - isopropylglycyl)-salicylamide hydrochloride.—A solution of 15 g. of 5-(N-benzyl-N-isopropyl glycyl)-salicylic acid methyl ester hydrochloride in 125 ml. of methanol and 125 ml. of 0.880 ammonia solution was allowed to stan din a stoppered flask. After six days, the solution was evaporated to dryness and the residue was extracted three times, each time with 150 ml. of ether. The free base began to precipitate from the ethereal solution. Treatment of the mixture with hydrogen chloride gas give a white oily material, which on boiling with ethyl acetate gave 12.5 g. of a white solid. Recrystallisation from methanol gave 11.0 g. of the amide hydrochloride as colorless crystals, M.P. 217–220°, after drying at 70° in vacuo to constant weight.

(c) 5-(1-hydroxy-2-isopropylaminoethyl)-salicylamide hydrochloride.—4.15 g. .of 5-(N-benzyl-N-isopropyl glycyl) salicylamide hydrochloride in 250 ml. of methanol were hydrogenated at room temperature and pressure in the presence of 1 g. of a 10% palladium oxide on charcoal catalyst. Uptake of hydrogen ceased after 40 minutes. The solution was filtered and evaporated to dryness. The residue was recrystallised from methanol/ethyl acetate to give 2.3 g. of the product, M.P. 207–8° C.

EXAMPLE 2

Preparation of 5-[2-(N-benzyl-N-isopropylamino)-1-hydroxyethyl]salicylamide 1.3 g. of 5-(N-benzyl-N-isopropyl glycyl) salicylamide were dissolved in 50 ml. of tetrahydrofuran, then added to a stirred solution of 1.0 g. of lithium aluminum hydride in 250 ml. of tetrahydrofuran and heated under reflux for 3 hours. After cooling, water was added to decompose the excess hydride and the mixture was acidified with dilute hydrochloric acid. The solution was evaporated almost to dryness and the pH was adjusted to 8–9. Extraction with ether and ethyl acetate afforded 0.9 g. of a pale yellow gum.

Chromatography on silica gel and elution with cyclo hexane ethyl acetate (1:1) gave 0.31 g. of a crystalline solid, M.P. 142.5–144.5. Recrystallisation from ether/petrol provided pure 5-(2-N-benzyl-N-isopropylamino-1-hydroxyethyl) salicylamide, M.P. 140–142°.

EXAMPLE 3

Preparation of N-hexyl-5-[1-hydroxy-2-isopropyl-aminoethyl] salicylamide hydrochloride (a) 5-(1 - hydroxy-2 - isopropylaminoethyl)-salicylic acid methylester hydrochloride.—3.0 g. of 5-(N-benzyl-N-isopropylglycyl)-salicylic acid methylester hydrochloride in 50 ml. of ethanol were hydrogenated with 0.52 g. of 10% palladium oxide catalyst. Hydrogen uptake was complete after 95 minutes. The solution, after removal of the catalyst was evaporated to dryness under reduced pressure to give 2.3 g. of a pale pink solid. Crystallisation from methanol/ethyl acetate gave 2.03 g. of colorless needles, M.P. 153–155° C.

(b) N-hexyl-5-(1-hydroxy-2 - isopropylaminoethyl)-salicylamide hydrochloride.—2.0 g. of the methyl ester of 5-(1-hydroxyethyl-2-isopropylamino) salicylic acid were dissolved in 10 ml. of ethanol containing 10 ml. of n-hexylamine and the solution was allowed to stand at room temperature. After 4 days all the ester had reacted and the solution was evaporated to dryness. Trituration with ethyl acetate containing a drop of menthanol afforded 3.0 g. of crystalline solid, M.P. 134–144°. Recrystallisation from ethyl acetate/ether containing one drop of ethanol gave N-hexyl-5-(1-hydroxy-2-isopropyl-aminoethyl) salicylamide as a white powder, M.P. 134–135°.

The hydrochloride was prepared by treating 1.8 g. of the above base in ethyl acetate with a solution of hydrogen chloride in ether and recrystallising the product from methanol/ethyl acetate (9:1). 1.1 g. of the N-hexyl-5-(1-hydroxyethyl - 2-isopropylamino) salicylamide hydrochloride separated as colourless plates, M.P. 199°.

EXAMPLE 4

Preparation of 5-(2-tert-butylamino-1-hydroxy-ethyl) salicylamide hydrochloride 1.0 g. of 5-(N-benzyl-N-tert-butylglycyl) salicylamide hydrochloride, 0.2 g. of 10% palladium oxide on charcoal catalyst, 20 ml. of ethanol and 15 ml. of water were shaken at room temperature in an atmosphere of hydrogen until uptake of hydrogen ceased. The catalyst was filtered off and the solvent was removed by distillation. The residue was crystallised from methanol/isopropyl acetate to give 0.56 g. of a pale pink solid, M.P. 203–4°.

EXAMPLE 5

Preparation of N-benzyl-5-(1-hydroxy-2-isopropyl-aminoethyl)-salicylamide, hydrochloride 8.0 g. of 5-(1-hydroxy-2-isopropylaminoethyl)-salicylic acid, methyl ester were dissolved in 40 ml. of ethanol containing 40 ml. of benzylamine. The solution was allowed to stand at room temperature for 4 days before evaporation to a small volume under reduced pressure. The gummy residue was treated with 50 ml. of dilute hydrochloric acid and the white solid was filtered off and recrystallised from methanol/ethyl acetate to afford 5.05 g. of N-benzyl-5-(1-hydroxy-2-isopropyl-aminoethyl)-salicylamide, hydrochloride, M.P. 208–209°.

EXAMPLE 6

Preparation of 5-(1-hydroxyethyl-2-isopropylamino-N-methyl)-salicylamide hydrochloride (a) 5 - (N-benzyl-N-isopropyl-glycyl)-N-methyl-salicyl-amide, hydrochloride.—2.5 g. of 5-(N-benzyl-N-isoproply-glycyl)-salicylic acid methyl ester, hydrochloride were dissolved in 50 ml. of a 30% solution of methylamine in ethanol. The solution was left overnight and was then evaporated to dryness under reduced pressure. The residue was dissolved in dilute hydrochloric acid and washed with ethyl acetate, and the aqueous layer made alkaline with sodium carbonate solution to pH 8 and again extracted with ethyl acetate. The latter organic extracts were dried over sodium sulphate, concentrated and treated with an ethereal solution of hydrogen chloride to afford 1.6 g. of 5-(N-benzyl-N-isopropyl-glycyl)-N-methyl-salicylamide, hydrochloride, M.P. 200–205°. Recrystallisation from ethyl acetate/ethanol gave rosettes, M.P. 205–209°.

(b) 5 - (1 - hydroxyethyl-2-isopropylamino)-N-methyl salicylamide hydrochloride.—4.2 g. of 5-(N-benzyl-N-isopropylglycyl-N-methyl salicylamide, hydrochloride were dissolved in 35 ml. of 90% aqueous methanol and this solution was added to a pre-reduced suspension of 1 g. of 10% palladium on carbon catalyst in 15 ml. of methanol.

The hydrogenation was stopped when 550 ml. of hydrogen had been absorbed. The catalyst was filtered off and the solution was concentrated to ca. 10 ml. and allowed to crystallise, affording 2.3 g. of 5-(1-hydroxy-2-isoproylaminoethyl-N-methyl salicylamide hydrochloride. Recrystallisation from ethanol gave fine colourless needles, M.P. 208–209° C.

EXAMPLE 7

Preparation of 4-[1-hydroxy-2-(isopropylamino)ethyl] salicylamide (a) 4 - [2 - benzylisopropylamino - 1 - hydroxyethyl] salicylamide.—A solution of 3.55 g. of 4-[2-benzylisopropylamino-1-hydroxyethyl] salicylic acid, methyl ester, hydrochloride in hot water was basified with sodium bicarbonate solution and the resulting suspension was extracted with ethyl acetate. The ethyl acetate solution was dried and evaporated, and the gummy residue dissolved in 50 ml. of ethanol. To this solution was added 30 ml. of 0.880 ammonia solution, and the resulting mixture was allowed to stand at room temperature for one week. The solution was then evaporated to dryness and the residue extracted with ether. The ether solution was evaporated to dryness, giving a whitish solid residue which was crystallised from benzene to give 1.53 g. of the product, M.P. 155–6° C.

(b) 4 - [hydroxy-2-(isopropylamino)ethyl] salicylamide.—A solution of 0.456 g. of 4 - [2 - benzylisopropylamino-1-hydroxyethyl] salicylamide in methanol was hydrogenated over 0.1 g. of pre-reduced 10% palladium on carbon catalyst. Uptake of hydrogen was complete in 19 mins. After filtering off the catalyst, the methanol solution was evaporated to dryness, leaving a glassy residue which was allowed to crystallise from a mixture of ether and ethyl acetate. This gave 0.236 g. of white prisms. M.P. 114–6°. From the analysis, infra-red spectrum, and equivalent weight the compound was found to contain 0.5 mole of ethyl acetate of crystallisation.

The benzoate derivative (prepared from a solution of the base in tetrahydrofuran and benzoic acid in ether) crystallised from isopropanol in small white prisms. M.P. 146–152°.

EXAMPLE 8

Preparation of 5-[1-hydroxy-2-(isopropylamino)-butyl] salicylamide, hydrochloride (a) 5 - [(α - isopropylamino) - butyryl]-salicylamide, hydrochloride.—A solution of 3.0 g. of 5-[(α-isopropylamino)-butyryl]-salicylic acid methyl ester hydrochloride in 50 ml. of ethanol and 0.880 ammonia was allowed to stand for 7 days at room temperature in a stoppered flask. The solution was evaporated to small bulk and the yellowish solid was filtered off. This was very insoluble in ether. The hydrochloride was prepared by dissolving the amide in ethanol and acidifying with dry hydrogen chloride gas to pH 4–6. The solvent was evaporated off and the off-white solid, residue was crystallised from ethanol to yield 2 g. of a white solid, M.P. 300°.

(b) 5 - [1 - hydroxy-2-(isopropylamino)-butyl]salicylamide, hydrochloride.—1.5 g. of 5 - [(α-ispropylamino) butyryl]-salicylamide hydrochloride in 175 ml. of methanol were hydrogenated at room temperature and pressure in the presence of 10% palladium oxide on carbon catalyst for 10 hours. The solution was filtered and evaporated to dryness. The white solid residue recrystallised from methanol/ethyl acetate as pale pink prisms containing 0.5 mole of ethyl acetate of crystallisation. The material was further crystallised from methanol/ether to give 1.0 g. of pale pink micro-crystals containing no solvent of crystallisation, M.P. 220–221°.

EXAMPLE 9

Preparation of 5-(2-tert-butylamino - 1 - hydroxy-ethyl)-N-[2-(dimethylamino) ethyl] salicylamide, dihydrogen maleate 5.0 g. of 5-(2-tert-butylamino-1-hydroxyethyl) salicylic acid methyl ester were dissolved in 25 ml. of dimethylaminoethylamine and allowed to stand at room temperature. After 24 hours, the solution was evaporated to dryness and the residue crystallised from ethyl acetate to afford 5.0 g. of a cream solid, M.P. 146–51°. This base was not purified further but a portion of 2 g. was dissolved in 50 ml. of tetrahydrofuran and treated with a solution of 1.5 g. of maleic acid in 10 ml. of tetrahydrofuran. A white solid separated out which on recrystallisation from 95% ethanol gave 2.63 g. of 5-(2-tert-butylamino - 1 - hydroxy-ethyl)-N-[2-(dimethylamino) ethyl] salicylamide, dihydrogen maleate, M.P. 199–200°.

EXAMPLE 10

Preparation of 5-[1-hydroxy-2-(isopropylamino)ethyl]-N-(2-hydroxyethyl) salicylamide, hydrate (a) 5 - [(N - benzyl, N-isopropyl)glycyl]-2-benzyloxybenzoic acid, methyl ester, hydrochloride.—A solution of 2.33 g. of 2-benzyloxy-5-bromoacetylbenzoic ester, methyl ester and 1.935 g. of N-benzylisopropylamine in 40 ml. of methyl ethyl ketone was stirred under reflux for 5 hours, and then allowed to stand at room temperature overnight. Benzylisopropylamine hydrobromide crystallised out and was filtered off. The filtrate was evaporated to dryness, dissolved in either and washed with water. The ether layer was then shaken with dilute HCl to produce a gum, which was extracted from the aqueous layer with chloroform. The chloroform solution was washed with brine, dried and evaporated, giving a gummy residue. When this was triturated with boiling acetone/ether 2.0 g. of a white solid was obtained, M.P. 160–162°.

(b) 5-{2-[(N-benzyl, N-isopropyl)amino]-1-hydroxyethyl}-2-benzyloxybenzoic acid, methyl ester, hydrochloride, hemihydrate.—4 g. of 5-[(N-benzyl, N-isopropyl) glycyl]-2-benzyloxybenzoic acid, methyl ester hydrochloride was dissolved in 90 ml. of ethanol and to the stirred solution was added 0.9 g. of sodium borohydride in small portions over 30 minutes, with stirring. The resulting suspension was stirred at room temperature for a further hour, and was then evaporated to dyness and the residue shaken with ether and filtered. The filtrate when treated with ethereal hydrochloric acid, gave 4.2 g. of a white solid, M.P. 120–30°. Crystallisation from ethyl acetate raised the M.P. to 134–136°.

(c) 5-[1-hydroxy - 2 - (isopropylamino)ethyl]N-2-hydroxyethyl salicylamide, hydrate.—10 g. of 5-[2-benzylisopropylamino - 1 - hydroxyethyl] - 2 - benzyloxybenzoic acid, methyl ester, hydrochloride, hemihydrate was basified to give 9.05 g. of white crystals. This was dissolved in a mixture of 100 ml. of ethanol and 40 ml. of ethanolamine and left to stand at room temperature for 2 weeks. The solution was then hydrogenated over 1.0 g. of 10% pre-reduced palladium on carbon catalyst. Uptake of hydrogen was complete in 2.5 hours. The catalyst was filtered off and the solvents were evaporated, leaving a white solid. This was crystallised from ethyl acetate/methanol, to give 5.2 g. of white micro-crysals, M.P. 152–3°.

The hydrochloride of this product, M.P. 195°, was crystallised from isopropanol.

EXAMPLE 11

Preparation of 5-[1-hydroxy-2-(isopropylamino)ethyl] salicylhydroxamic acid (a) α[(benzylisopropylamino)methyl] - 6 - benzyloxy-α-hydroxy-m-toluhydroxamic acid.—4.0 g. of 5-{2-[benzylisopropylamino] - 1 - hydroxyethyl} - 2 - benzyloxybenzoic acid, methyl ester, hydrochloride, hemihydrate, in 30 ml. of methanol was added to hydroxylamine solution prepared by mixing a solution of 16.3 g. of hydroxylamine hydrochloride in 110 ml. of methanol with a solution of 5.5 g. of sodium in 50 ml. of methanol, and filtering the precipitated NaCl.

After 1 month standing in a stoppered vessel at room temperature, the solution was evaporated, and the oily residue was extracted with ether (3× 150 ml.). Evaporation of the ether gape an oil which was dissolved in a large volume (ca. 500 ml.) of cyclohexane. On cooling, an oil precipitated and solidified within two days to give 2.2 g. of a white solid.

Recrystallisation from cyclohexane gave white crystals of the hydroxamic acid, M.P. 138–140°.

(b) 5-[1-hydroxy - 2 - (isopropylamino)ethyl] salicylhydroxamic acid.—1.45 g. of α-[(benzylisopropylamino) methyl]-6-benzyloxy-α-hydroxy-m-toluhydroxamic acid in 32 ml. of methanol was hydrogenated in the presence of 0.4 g. of pre-reduced 10% palladium oxide on carbon catalyst suspended in 8 ml. of water. Hydrogenation was completed after 15 minutes. The solution was filtered and evaporated to yield a white solid. Further material was obtained by extracting the catalyst residues with 75 ml. of hot water. The solids were combined and triturated with tetrahydrofuran, followed by ethanol, to yield 0.46 g. of the product as a white solid, M.P. 186–188°.

EXAMPLE 12

Preparation of 5-(2-tert-butylamino-1-hydroxyethyl) salicylic acid hydrazide 5.0 g. of 5-(1-tert-butylamino-1-hydroxyethyl)salicylic acid, methyl ester was dissolved in a solution of 30 ml. of hydrazine hydrate in 20 ml. of ethanol and allowed to stand overnight at room temperature. The solution was evaporated to dryness and the brown residue triturated with ethanol/tetrahydrofuran to give 4 g. of a cream solid which did not melt but gradually decomposed with charring above 300°.

EXAMPLE 13

Preparation of 5-(2-benzylisopropylamino-1-hydroxyethyl)-salicylic acid methyl ester hydrochloride 12.0 g. of 5-(N-benzyl-N-isopropyl glycyl)-salicylic acid methyl ester hydrochloride in 230 ml. of ethanol were treated with 2.404 g. of sodium borohydride, added portionwise over 30 mins. at room temperature. The mixture was allowed to stand overnight. Reduction was shown to be complete by the disappearance of the band at 278 m$\mu$ in the U.V. spectrum. The mixture was then evaporated to dryness under reduced pressure at 40°, and the residue was extracted with ether (3 × 100 ml.). The ether extracts were dried over MgSO$_4$, and treated with hydrogen chloride gas. The precipitated white oily material gave 6.8 g. of a white solid on boiling with ethyl acetate. Recrystallisation from acetone/ether gave 5.5 g. of the ester hydrochloride as colorless microcrystals.

EXAMPLE 14

Preparation of 4-hydroxy-$\alpha^1$-isopropylaminomethyl-m-xylene-$\alpha^1,\alpha^3$ diol (a) $\alpha^1$-Benzylisopropylaminomethyl - 4 - hydroxy-m-xylene-$\alpha^1,\alpha^3$ diol.—22.0 g. of 5-(N-benzyl-N-isopropyl-glycyl)salicylic acid methyl ester hydrochloride was basified with aqueous sodium bicarbonate solution and extracted into ether. After drying over sodium sulphate, the solution was evaporated to dryness and the residue was dissolved in 150 ml. of tetrahydrofuran. This solution was added dropwise to 4 g. of lithium aluminum hydride in 300 ml. of tetrahydrofuran. An insoluble complex formed. The mixture was refluxed for 7 hours under nitrogen, cooled, treated with 10 ml. of water and filtered. The solid together with the residue from evaporation of the filtrate was dissolved in dilute hydrochloric acid, and this solution was basified with aqueous sodium bicarbonate solution, and continuously extracted with ether to give the free base as a gum. Crystallisation from ether/petrol gave $\alpha^1$-benzylisopropyl-amino-methyl-4-hydroxy-m-xylene-$\alpha^1,\alpha^3$ diol as white crystals, M.P. 115–6°.

(a) 4-hydroxy-$\alpha^1$-isopropylaminomethyl - m - xylene-$\alpha^1,\alpha^3$ diol.—4.5 g. of $\alpha^1$-benzylisopropylaminomethyl-4-hydroxy-m-xylene-$\alpha^1,\alpha^3$ diol in 100 ml. of ethanol and 10 ml. of water were hydrogenated at room temperature and pressure in the presence of 1.2 g. of a 10% palladium oxide on charcoal catalyst, until the uptake of hydrogen slowed markedly. The solution was filtered and evaporated to dryness. The oily residue solidified on being allowed to stand in 25 ml. of ethyl acetate to give 3.5 g. of the crystalline hydroxy diol, M.P. 139–140° C. Purification by precipitation from a solution of tetrahydrofuran with ether raised the melting point to 143–45° C.

EXAMPLE 15

Preparation of 4[1-hydroxy-2-(isopropylamino)ethyl] salicylic acid, methyl ester, hydrochloride (a) 4-[2-benzylisopropylamino - 1 - hydroxyethyl]salicylic acid, methyl ester, hydrochloride.—2.7 g. of 4-(bromoacetyl)salicylic acid, methyl ester were dissolved in 7.5 ml. of dry tetrahydrofuran and added at room temperature to a solution of 2.94 g. of N-benzylisopropyl-amine in 7.5 ml. of dry tetrahydrofuran. The resulting mixture was left to stand for 4 hours. After this time the crystals of N-benzylisopropylamine hydrobromide were filtered off and the filtrate was treated with a solution of 0.6 g. of sodium borohydride in 15 ml. of 90% ethanol. The resulting mixture was allowed to stand at room temperature for 3 days. The mixture was then evaporated to dryness, the residue was partitioned between ether and water, and the ether solution was dried and evaporated. The liquid residue was dissolved in 60 ml. of dry ether/ethyl acetate (1:1). This gave, on scratching with a glass rod, 2.4 g. of a white solid, M.P. 150–160°. Crystallisation from ethyl acetate/methanol gave 1.615 g. of the product, M.P. 174–175.5°.

(b) 4[1-hydroxy - 2 - (isopropylamino)ethyl]salicylic acid, methyl ester, hydrochloride.—A solution of 1.0 g. of 4-[2-(N-benzyl,N-isopropyl)amino - 1 - hydroxyethyl] salicylic acid, methyl ester, hydrochloride in 50 ml. of ethanol was hydrogenated over 0.2 g. of pre-reduced 10% palladium oxide on charcoal catalyst. The volume of hydrogen absorbed in 10 minutes was 60 ml. The catalyst was then filtered off and the filtrate evaporated to dryness. Trituration of the residue with ethyl acetate/ether gave 0.68 g. of a white solid, M.P. 166–8°. Crystallisation from ethyl methyl ketone gave 0.31 g. of the product as large white crystals, M.P. 171.5–173° C.

EXAMPLE 16

Preparation of $\alpha^1$-tert-butylaminomethyl-4-hydroxy-m-xylene-$\alpha^1,\alpha^3$-diol (a) $\alpha^1$-Benzyl-tert-butylaminomethyl - 4 - hydroxy-m-xylene-$\alpha^1,\alpha^3$-diol.—3.0 g. of 5-(N-benzyl - N - tert-butyl-glycyl)-salicylic acid methyl ester hydrochloride in 40 ml. of water was basified with sodium bicarbonate solution and extracted into ether. The ethereal solution was dried over MgSO$_4$ and evaporated and the basic residue in 20 ml. of dry tetrahydrofuran was added with stirring to 1.0 g. of lithium aluminium hydride in 100 ml. of dry tetrahydrofuran, over a period of 5 minutes. The light gelatinous precipitate that formed was stirred and refluxed for 8 hours after which time 7 ml. of water was carefully added and the solvents were removed under reduced pressure.

The residue was acidified with dilute hydrochloric acid and brought to pH 8 with sodium hydroxide and sodium bicarbonate. The mixture was filtered and the filtrate and orange solid were separately extracted with chloroform. The combined, dried, chloroform solutions were evaporated to give 2.2 g. of the crude basic triol as an orange solid, when triturated with ether. A portion of the material was recrystallised from ether/light petroleum (B.P. 40–60°) to give a white solid, M.P. 109–111° C.

In an alternative process, sodium borohydride was used as the reducing agent, as follows:

36 g. of 2 - (benzyltert-butylamino)-4'-hydroxy-3'-hydroxymethyl acetophenone, hydrochloride was shaken with 100 ml. of 10% sodium carbonate solution and 100 ml. of ethyl acetate. The ethyl acetate layer was separated, washed with water, dried over anhydrous sodium sulphate and evaporated in vacuo.

The residual gum was dissolved in 360 ml. of ethanol and cooled to 15° in an ice/water bath. 8 g. of sodium borohydride was then added in portions over 30 min. whilst maintaining the temperature at 15–20°. After a further 30 mins. at 20° the solution was stirred at room temperature for 2 hours. The solution was again cooled in ice and 250 ml. of 2 N sulphuric acid were slowly added, then the solution was evaporated in vacuo until the ethanol had been removed. The clear aqueous solution was then treated with 250 ml. of 10% sodium carbonate solution and the oil which precipitated was extracted into ethyl acetate. The ethyl acetate layer was washed with sodium carbonate solution, then with water, and was dried over anhydrous sodium sulphate and evaporated in vacuo, to a small volume. Petroleum ether (B.P. 40–60°) was added, and after standing overnight a white solid was obtained. This was filtered off to give 23 g. of the product, M.P. 110–114°.

(b) $\alpha^1$-tert-butylaminomethyl-4-hydroxy - m - xylene-$\alpha^1,\alpha^3$-diol.—0.8 g. of $\alpha^1$-benzyl-tert-butylaminomethyl-4-hydroxy-m-xylene-$\alpha^1,a^3$-diol in 20 ml. of ethanol and 2 ml. of water was shaken with hydrogen in presence of 0.5 g. of pre-reduced 10% palladium on charcoal catalyst. When uptake of hydrogen was complete, the solution was filtered and evaporated under reduced pressure to give 0.4 g. of the base as a colourless oil which yielded a white solid M.P. 144–145° when triturated with ether/cyclohexane. Recrystallisation from ethyl acetate-cyclohexane gave a white solid M.P. 147–149°.

EXAMPLE 17

Preparation of 4-hydroxy-$\alpha^1$-[(methylamino)methyl]-m-xylene-$\alpha^1,\alpha^3$-diol (a) $\alpha^1$-[(Benzylmethylamino)methyl] - 4 - hydroxy-m-xylene-$\alpha^1,\alpha^3$-diol.—21.3 g. of 5 - (N-benzyl-N-methylglycyl)-salicylic acid ethyl ester was dissolved in 140 ml. of tetrahydrofuran. This solution was added dropwise to a stirred suspension of 5.6 g. of lithium aluminium hydride in 175 ml. of dry tetrahydrofuran in an atmosphere of nitrogen. After the addition was completed, the mixture was stirred at room temperature for one hour, then 45 ml. of water was added dropwise. The tetrahydrofuran was removed by distilling in vacuo and dilute hydrochloric acid was added. The acid solution was basified with sodium bicarbonate solution and extracted with ether (5× 50 ml.). The ethereal solution was washed three times with saline and after drying over anhydrous Na$_2$SO$_4$ it was evaporated in vacuo to give 8.7 g. of the product as a white solid, M.P. 132–134° C.

(b) 4 - hydroxy-$\alpha^1$-[(methylamino)methyl]-m-xylene-$\alpha^1,\alpha^3$-diol.—2.0 g. of $\alpha^1$-[(benzylmethylamino)methyl]-4-hydroxy-m-xylene $\alpha^1,\alpha^3$-diol were reduced in 30 ml. of ethanol containing 1 ml. of triethylamine and 1 ml. of water, using 0.5 g. of 10% palladium oxide on charcoal as catalyst. Hydrogen uptake was complete after 15 minutes. The catalyst was removed by filtration and the solution was evaporated to dryness in vacuo to give 1.55 g. of a friable solid. This base in methanol was added to a solution of 0.9 g. of maleic acid in methanol. The solution was warmed and ethyl acetate was added to effect crystallisation. 1.15 g. of the maleate were obtained as colourless needles, M.P. 109–111°.

EXAMPLE 18

Preparation of 3-hydroxy-$\alpha^1$-(isopropylamino)methyl-p-xylene-$\alpha^1,\alpha^4$-diol (a) $\alpha^1$-[Benzylisopropylamino]methyl - 3 - hydroxy-p-xylene-$\alpha^1,\alpha^4$-diol.—A solution of 1.58 g. of N-benzyl-isopropylamine in 4 ml. of dry tetrahydrofuran was added all at once at approx. 10° to a solution of 1.45 g. of 4-bromoacetylsalicylic acid, methyl ester in 4 ml. of dry tetrahydrofuran and the flask was stoppered and left to stand for 3 hours. The crystalline benzylisopropylamine hydrobromide which formed was filtered off and the filtrate was slowly added to a slurry of 1.7 g. of lithium aluminium hydride in 100 ml. of dry tetrahydrofuran, with stirring. The resulting mixture was heated to boiling and stirred under reflux for 15 minutes. After cooling and leaving to stand overnight, the excess lithium aluminium hydride was decomposed with the minimum of water and the resulting mixture was evaporated to dryness. The residue was shaken with dilute HCl and filtered, the filtrate was extracted with ether, then the aqueous layer was basified to pH 8 with sodium bicarbonate solution and extracted with ethyl acetate. The ethyl acetate solution was dried and evaporated to dryness. The residue was allowed to crystallise from ether, giving 0.99 g. of yellowish crystals, M.P. 103–8°.

(b) 3 - hydroxy-$\alpha^1$-(isopropylamino)methyl-p-xylene-$\alpha^1,\alpha^4$-diol.—0.6 g. of $\alpha^1$-[benzylisopropylamino]methyl-3-hydroxy-p-xylene-$\alpha^1,\alpha^4$-diol was dissolved in 30 ml. of ethanol and to this solution was added 0.15 g. of triethylamine. This solution was hydrogenated over 0.15 g. of pre-reduced 10% palladium on carbon catalyst. A total of 46.5 ml. of hydrogen was absorbed in 10 minutes. After filtering and evaporating to dryness, the residue was crystallised from ethyl acetate/ether, then from tetrahydrofuran/petrol (B.P. 40–60°) and was then dried in vacuo at 50° for 3 hours to give 0.3 g. of a white crystalline solid, M.P. 103–5° C.

EXAMPLE 19

Preparation of 4-hydroxy-$\alpha^1$-(1-isopropylaminopropyl)-m-xylene-$\alpha^1,\alpha^3$-diol (a) 5 - (2 - bromo-butyryl)-salicylic acid, methyl ester.—A solution of 104 g. of bromine in 1000 ml. of chloroform was added dropwise to a stirred solution of 144 g. of 5-butyryl-salicylic acid, methyl ester in 300 ml. of chloroform at room temperature. The reaction was at first extremely slow, and only after about 1 hr. was hydrogen bromide gas evolved at an appreciable rate.

The bulk of the bromine solution was then run in over a further hour. The solution was stirred for an additional 15 mins. cooled and washed three times with cold water. The solvent was distilled off under reduced pressure leaving a pure white solid residue which was recrystallised once from ethanol, to give 200 g. of the product, M.P. 83°.

(b) 5 - (2 - isopropylamino-butyryl)-salicyclic acid, methyl ester hydrochloride.—A solution of 45 g. of 5-(2-bromo-butyryl)-salicyclic acid methyl ester and 30 g. of isopropylamine in 30 ml. of methanol was boiled under reflux for 5 hrs. The mixture was evaporated under reduced pressure, the oily residue treated with dry ether, and the insoluble hydrobromide filtered off. The ethereal solution was boiled with charcoal and filtered. Dry hydrogen chloride gas was then bubbled into the solution and the hydrochloride precipitated as a white crystalline solid which was crystallised twice from methanol/ether, to give 20 g. of the product, M.P. 250° C.

(c) 4-hydroxy-$\alpha^1$-(1-isopropylaminopropyl)-m-xylene-$\alpha^1,\alpha^3$-diol.—An aqueous suspension of 10 g. of 5-(2-isopropylaminobutyryl)-salicylic acid, methyl ester hydrochloride was basified with 10% sodium bicarbonate solution and extracted into ether. The ethereal solution was dried over MgSO$_4$, the solvent evaporated and the gummy residue, in 60 ml. of sodium-dried tetrahydrofuran, was added cautiously with stirring to 3.0 g. of lithium aluminium hydride in 300 ml. of dry tetrahydrofuran. The mixture was heated under reflux with stirring for 30 mins. and was then cooled. 21 ml. of water was added dropwise with vigorous stirring and the mixture was allowed to stand overnight before the solvents were evaporated off. The solid residue was acidified with dilute hydrochloric acid to pH 6 and this solution was basified with dilute sodium hydroxide and sodium bicarbonate to pH 8. The gelatinous insoluble hydroxides were then centrifuged and the filtrate was continuously extracted with chloroform. The solvent was evaporated off and the oily basic residue taken up in ether. Dry hydrogen chloride gas was passed into the solution and the white crystalline precipitate thus obtained was filtered off and crystallised from ethanol, to give 5 g. of the product, M.P. 199°.

EXAMPLE 20

Preparation of 5-(2-amino-1-hydroxyethyl)-salicylic acid methylester hydrochloride (a) 5-(N,N-dibenzylaminoglycyl)-o-anisic acid methylester, hydrochloride.—6.0 g. of 5-bromoacetyl-o-anisic acid methyl ester (see Example 34(a)) and 7.8 g. of dibenzylamine in 200 ml. of ethyl methyl ketone were refluxed for 2 hours with stirring. Solid appeared within 2 mins. After removal of the dibenzylamine hydrobromide by filtration, the solution was evaporated to dryness and treated with ether. Some insoluble brown material was removed and hydrogen chloride was passed through the ethereal solution. The dark gummy solid which precipitated was recrystallised from methanol/ethyl acetate to give 2.0 g. of the hydrochloride as a white solid, M.P. 163–165°.

After two recrystallisations from methanol/ethyl acetate, colourless needles were obtained, M.P. 166–8°.

(b) 5-(N,N-dibenzylglycyl)-salicylic acid hydrobromide.—2.0 g. of 5-(N,N-dibenzylglycyl)-o-anisic acid, methyl/ester hydrochloride and 40 ml. of 48% aqueous hydrobromic acid were refluxed for 2 hours. The initially clear solution gradually deposited a white solid. After being cooled the mixture was filtered to give 2.0 g. of the acid hydrobromide as a white solid, M.P. 165–166°.

(c) 5-(N,N-dibenzylglycyl)-salicylic acid methyl ester hydrochloride.—8.78 g. of the acid hydrobromide were obtained in (b) were refluxed with a mixture of 22% methanolic hydrogen chloride (20 ml.) and methanol (50 ml.) for 16 hrs. The solution was evaporated to dryness and an ethereal solution of the residue was shaken with sodium bicarbonate solution. The ethereal solution was dried over $MgSO_4$ and treated with methanolic hydrogen chloride to give 7.0 g. of a white solid, M.P. 167–169°.

(d) 5-(2-amino-1-hydroxyethyl)salicylic acid methyl ester hydrochloride.—6.4 g. of 5-(N,N-dibenzylaminoglycyl)-salicylic acid methyl ester hydrochloride in 150 ml. of methanol were hydrogenated in the presence of 1.0 g. of a 10% palladium oxide on charcoal catalyst. Uptake of hydrogen ceased after 9 hrs. The catalyst was removed by filtration, and the filtrate was concentrated and treated with ether to precipitate 2.75 g. of the product as a white solid, M.P. 168–170°, which was recrystallised from methanol/ethyl acetate to give colourless plates, M.P. 187–188°.

EXAMPLE 21

Preparation of $\alpha^1$-aminomethyl-4-hydroxy-m-xylene-$\alpha^1,\alpha^3$-diol A solution of 1.9 g. of $\alpha^1$-dibenzylaminomethyl-4-hydroxy-m-xylene-$\alpha^1,\alpha^3$-diol in 50 ml. of ethanol and 5 ml. of water was shaken in an atmosphere of hydrogen in presence of 0.5 g. of pre-reduced 10% palladium on charcoal catalyst. Uptake of hydrogen was complete in 6 hours. The catalyst was removed and the solution was evaporated to dryness under reduced pressure to leave 0.9 g. of the product as a cream solid, M.P. 151–152°.

EXAMPLE 22

Preparation of 5-[1-hydroxy-2(methylamino)ethyl] salicylic acid ethyl ester, hydrochloride (a) 5-(N-benzyl-N-methylglycyl)-salicylic acid ethyl ester hydrochloride.—20 g. of 5-bromoacetylsalicylic acid ethyl ester, 15.2 g. of N-benzylmethylamine and 250 ml. of ethyl/methyl ketone were stirred and refluxed for 1.5 hours. The solid that precipitated was filtered and the filtrate was evaporated in vacuo leaving a yellow oil.

Dry ether was added to the residue and the ethereal solution was filtered. The clear filtrate was treated with dry HCl gas and 13.4 g. of the white precipitate M.P. 158–160° was removed by filtration. Recrystallisation from ethanol/ether gave the product as colourless needles M.P. 169–171° C.

(b) 5-[1-hydroxy-2(methylamino)ethyl]-salicyclic acid ethyl/ester hydrochloride.—3.0 g. of 5 - (N-benzyl-N-methylglycyl) salicylic acid ethyl/ester hydrochloride in 30 ml. of ethanol was hydrogenated with 1 g. of 10% palladium oxide on charcoal as catalyst. Hydrogen uptake was complete after 2.75 hours. The solution, after removal of the catalyst by filtration, was evaporated to dryness under reduced pressure, and the residue was crystallised from ethanol/ethyl acetate to give 1.6 g. of the product as colourless microneedles, M.P. 129–130° C.

EXAMPLE 23

Preparation of 5-[1-hydroxy-2-(p-methoxy-$\alpha$-methylphenethyl)amino ethyl] salicyclic acid, methyl ester, hydrochloride 1.08 g. of 5[(1-hydroxy-2-amino)ethyl] salicylic acid methyl ester hydrochloride in 100 ml. of methanol, basified by the addition of 25 ml. of methanolic sodium methoxide containing 0.10 g. of sodium and 0.72 g. of p-methoxyphenyl-2-propanone, were hydrogenated in the presence of 1.0 g. of prereduced 10% palladium oxide on charcoal catalyst, suspended in 25 ml. of methanol. Uptake of hydrogen ceased within twenty hours. The solution was filtered and evaporated, and the resulting oil was dissolved in ether. After filtering to remove sodium chloride, ethereal hydrogen chloride was added to the ether solution to precipitate an oil which gradually solidified within 15 minutes. The solid crystallised from acetone-ether to give 0.6 g. of the product as white crystals M.P. 155–161°.

EXAMPLE 24

Preparation of 4 - hydroxy-$\alpha^1$-{[(2-indol-3-yl-1-methylethyl) amino] methyl}-m-xylene-$\alpha^1,\alpha^3$-diol hydrogen tartrate (a) 5-{1-hydroxy-[(2-indol-3-yl-1-methylethyl)amino]ethyl}-salicyclic acid methyl ester.—A solution of 0.71 g. of sodium hydroxide in ethanol was added to a solution of 4.4 g. of 5-(2-amino-1-hydroxyethyl)-salicyclic acid methyl ester hydrochloride in ethanol. The total volume of the solution was 250 ml. Sodium chloride was then removed and the solution was hydrogenated in presence of 1.0 g. of 10% palladium on charcoal catalyst and 3.8 g. of indol-3-yl-2-propanone. Uptake of hydrogen ceased after 25 hours. The catalyst and solvent were removed to leave a straw coloured oil. This was separated from sodium chloride by solution in ether, followed by filtration and evaporated to give 7.1 g. of the crude ester as an oil.

(b) 4-hydroxy-$\alpha^1$-{[(2-indol - 3 - yl - 1 - methylethyl)amino]methyl}-m-xylene-$\alpha^1,\alpha^3$-diol, hydrogen tartrate.—6.5 g. of 5-(1-hydroxy-2[(2-indol-3-yl-1-methylethyl) amino]ethyl) salicylic acid methyl ester in 100 ml. of tetrahydrofuran were added to a stirred suspension of 1.4 g. of lithium aluminium hydride in 50 ml. of tetrahydrofuran, in an atmosphere of nitrogen, at a rate sufficient to maintain refluxing of the solvent. After 1 hour, 10 ml. of water was cautiously added and the mixture was concentrated under reduced pressure. The residue was treated with dilute hydrochloric acid and non-basic indole derivatives were removed by extraction with ethyl acetate.

The acid solution was neutralised with sodium bicarbonate and extracted four times with ethyl acetate. After being dried over $MgSO_4$ and evaporated, the latter yielded 2.0 g. of a buff friable solid. This base was dissolved in 30 ml. of ethyl acetate and added to a solution of 0.8 g. of racemic tartaric acid in 30 ml. of methanol, to precipitate a pale brown gum. When triturated with ethyl acetate this slowly yielded 1.6 g. of a friable tan solid M.P. ca. 93–100°. Recrystallisation from methanol/dry ether afforded a brown gum which when triturated with dry ether gave 0.8 g. of the product as a buff solid M.P. ca. 112°, frothing from ca. 70°.

EXAMPLE 25

Preparation of 5-{1-hydroxy-2-[(1-methyl-2-piperidinoethyl)amino]ethyl}salicylic acid methyl ester 3.65 g. of 5-[(2-amino-1-hydroxy)ethyl]salicylic acid methyl ester hydrochloride in 75 ml. of methanol were basified by the addition of 25 ml. of methanolic sodium methoxide containing 0.34 g. of sodium, and then added to 2.10 g. of 1-piperidino-2-propanone. The mixture was hydrogenated in the presence of 1 g. of 10% palladium oxide on charcoal catalyst suspended in 25 ml. of methanol. Uptake of hydrogen was completed within 25 hours.

The solution was filtered and evaporated and the resulting oil was separated from sodium chloride by extraction with ethyl acetate. The ethyl acetate was evaporated and the resulting oil taken up in acetone/ether. The solution deposited an oil which after two days formed a solid. This was recrystallised from cyclohexane/light petroleum (B.P. 70–80°), to yield white crystals of the product, M.P. 112.5–113.5°.

EXAMPLE 26

Preparation of 4-hydroxy-$\alpha^1$-{[(1-methyl-2-phenoxyethyl)amino]methyl}-m-xylene-$\alpha^1,\alpha^3$-diol (a) 5-{1-hydroxy - 2 - [(1 - methyl-2-phenoxyethyl) amino]ethyl}-salicylic acid methyl ester.—5.0 g. of 5-(N,N-dibenzylglycyl)-salicylic acid methyl ester hydrochloride in ethanol was reduced with hydrogen in presence of 1.0 g. pre-reduced 10% palladium on charcoal catalyst. After 17 hours uptake of hydrogen ceased.

A solution of 0.45 g. of sodium hydroxide in 20 ml. of ethanol and 1.9 g. of 1-phenoxy-2-propanone was added and reduction was continued in presence of a similar quantity of fresh catalyst. After 52 hours uptake of hydrogen ceased. The catalyst and solvent were removed and the residue was partitioned between water and ether. The ether was dried and removed to leave 3.0 g. of the crude ester as a pale amber oil.

(b) 4 - hydroxy-$\alpha^1$-{[(1-methyl-2-phenoxyethyl)amino] methyl}-m-xylene-$\alpha^1,\alpha^3$-diol.—2.7 g. of 5-{1-hydroxy-2-[(1-methyl-2-phenoxyethyl)amino]ethyl}-salicylic acid methyl ester dissolved in 50 ml. of dry tetrahydrofuran, were added to a warm stirred suspension of 0.6 g. of lithium aluminium hydride in 20 ml. of tetrahydrofuran, in an atmosphere of nitrogen, at a rate to maintain the solvent at the reflux. The resulting white gelatinous precipitate was stirred and warmed for 1 hour, then cooled and decomposed by dropwise addition of 5 ml. of water. The mixture was concentrated under reduced pressure, more water was added and the pH was adjusted to 8 by addition of hydrochloric acid followed by sodium bicarbonate.

The mixture was extracted with ethyl acetate, which was dried and evaporated to yield an amber oil. Trituration with ether gave 0.9 g. of the triol as a cream solid. Recrystallisation from ethyl acetate/cyclohexane afforded a white solid M.P. 128–130° C.

EXAMPLE 27

Preparation of 4-hydroxy-$\alpha^1$-[($\alpha$-methylphenethylamino) methyl]-m-xylene-$\alpha^1,\alpha^3$-diol (a) 5 - [1 - hydroxy-2-($\alpha$-methylphenethylamino)ethyl]-salicylic acid methyl ester.—3.2 g. of 5-(N,N-dibenzylaminoglycyl)-salicylic acid methyl ester and 1.2 g. of benzyl methyl ketone in 100 ml. of ethanol were shaken in an atmosphere of hydrogen in presence of 1.0 g. of 10% prehydrogenated palladium on charcoal catalyst. Uptake of hydrogen ceased after 40 hrs. The catalyst and solvent were removed to give an oil which was extracted into dilute hydrochloric acid and ether. The aqueous solution was washed with ether and treated with excess sodium bicarbonate solution. The liberated base was extracted by ether which was washed, dried over MgSO$_4$ and evaporated to give 1.3 g. of the crude basic ester as a colourless oil.

(b) 4 - hydroxy-$\alpha^1$-[($\alpha$-methylphenethylamino)methyl]-m-xylene-$\alpha^1,\alpha^3$-diol.—1.3 g. of 5 - [1-hydroxy-2-($\alpha$-methylphenylamino)ethyl]-salicylic acid methyl ester in 20 ml. of dry tetrahydrofuran were added to a stirred suspension of 1.5 g. of lithium aluminium hydride in 50 ml. of dry tetrahydrofuran at a rate to maintain refluxing of the solvent.

After 1 hour at the reflux the mixture was cooled and decomposed by dropwise addition of 5 ml. of water, with stirring. The mixture was evaporated nearly to dryness under reduced pressure and the residue was treated with excess dilute hydrochloric acid, followed by sodium bicarbonate solution.

The resulting basic mixture was extracted four times with ethyl acetate which was dried and evaporated to yield a yellow oil. When triturated with ether this gave 0.3 g. of the product as a white solid. Recrystallisation from ethyl acetate gave colourless crystals, M.P. 113–115°.

The p-hydroxy-$\alpha$-methyl compound has been prepared by processes analogous to those described above for the unsubstituted $\alpha$-methyl compound. The structure of p-hydroxy-$\alpha$-methyl compound, that is, 4-hydroxy-$\alpha^1$-[(p-hydroxy - $\alpha$ - methylphenethylamino)methyl]-m-xylene-$\alpha^1$,$\alpha^3$-diol was confirmed by nuclear magnetic resonance and ultraviolet and infrared spectra.

EXAMPLE 28

Preparation of 4-hydroxy-$\alpha^1$-{[(3,4,5-trimethoxy-$\alpha$-methylphenethyl)amino]methyl}-m-xylene-$\alpha^1,\alpha^3$-diol 4 - hydroxy - $\alpha^1$-{[(3,4,5-trimethoxy-$\alpha$-methylphenethyl) amino]methyl}-m-xylene-$\alpha^1,\alpha^3$-diol.—1.7 g. of $\alpha^1$-aminomethyl - 4 - hydroxy-m-xylene-$\alpha^1,\alpha^3$-diol in 12.5 ml. of methanol containing 1 g. of triethylamine, and 2.2 g. of (3,4,5-trimethoxyphenyl)-2-propanone were hydrogenated in the presence of 0.25 g. of pre-reduced Adams catalyst suspended in 15 ml. of water. Uptake of hydrogen ceased within 16 hours.

The solution was filtered and evaporated, and the resulting oil extracted with boiling benzene. On cooling the solution, a white gum was deposited which, on standing overnight in a small volume of ether followed by drying in vacuo at 40° for 24 hours, gave 1.65 g. of the product as white crystals, M.P. 90–98°.

EXAMPLE 29

Preparation of 4-hydroxy-$\alpha^1$-{[(p-methoxy-$\alpha$-methylphenethyl)amino]methyl}-m-xylene-$\alpha^1,\alpha^3$-diol 1.03 g. of $\alpha^1$ - aminomethyl-4-hydroxy-m-xylene-$\alpha^1,\alpha^3$-diol in 75 ml. of methanol containing 10 ml. of water, 0.5 g. of triethylamine and 0.92 g. of p-methoxyphenyl-2-propanone were hydrogenated in the presence of 0.5 g. of pre-reduced Adams catalyst suspended in 25 ml. of methanol.

Uptake of hydrogen ceased within fifteen hours. The solution was then filtered and evaporated, and the resulting oil was extracted with boiling benzene. On cooling the solution, a white gum was deposited, which, on drying in vacuo over paraffin wax, gave 0.70 g. of the product as white crystals, M.P. 89–93° C.

EXAMPLE 30

Preparation of 4-hydroxy-$\alpha^1$-{[(1-methyl-2-morpholinoethyl)amino]methyl}-m-xylene-$\alpha^1,\alpha^3$ diol 1.63 g. of $\alpha^1$-aminomethyl - 4-hydroxy-m-xylene-$\alpha^1,\alpha^3$-diol in 110 ml. of methanol, containing 1.0 g. of triethylamine, and 1.22 g. of 1-morpholino-2-propanone, were hydrogenated in the presence of 0.25 g. of pre-reduced Adams catalyst suspended in 15 ml. of water. Uptake of hydrogen ceased within 16 hr.

The solution was filtered and evaporated to give an oil which only partially solidified. Crystallisation from ethyl acetate gave an oil, which when triturated, afforded the product as a white solid, 0.60 g. of the product, M.P. 134–145° was obtained.

EXAMPLE 31

Preparation of 4-hydroxy-$\alpha^1$-[(4-hydroxy-1-methylbutyl) amino] methyl-m-xylene-$\alpha^1,\alpha^3$-diol 1.5 g. of $\alpha^1$-amino-4-hydroxy-m-xylene-$\alpha^1,\alpha^3$-diol in 85 ml. of methanol containing 15 ml. of water, 0.5 g. of triethylamine and 0.87 g. of 5-hydroxy-2-pentanone were hydrogenated in the presence of 0.16 g. of pre-reduced Adams catalyst suspended in 25 ml. of methanol.

After 60 hours, uptake of hydrogen ceased, but thin layer chromatography showed that some of the unchanged primary amine was still present. Reduction was continued in the presence of a further portion of 0.16 g. of pre-reduced Adams catalyst. Uptake ceased after a further 25 hours when thin layer chromatography showed only a trace of the primary amine.

The solution was filtered and evaporated to give an oil which, on trituration with dry ether and prolonged drying in vacuo, became a white, highly deliquescent, friable solid. A preparative thin layer chromatogram (silica/ methanol) containing 3% 0.880 ammonia solution on 280 mg. of this solid gave two fractions at Rf 0.60 and Rf 0.80, visible under U.V. light. The former was extracted with dry methanol (2× 50 ml.) to give 140 mg. of a white, highly deliquescent friable solid. The N.M.R. spectrum showed the structure of this solid to be consistent with the required base, although it contained ca. of the product of hydrogenolysis of the $\alpha^3$ alcohol group.

EXAMPLE 32

Preparation of 4-hydroxy-$\alpha^1$\{[($\alpha$-methyl-p-ethoxyphenoxyethyl amino]methyl\}m-xylene-$\alpha^1,\alpha^3$-diol 1.5 g. of $\alpha^1$-amino-4-hydroxy-m-xylene-$\alpha^1,\alpha^3$-diol in 110 ml. of methanol containing 1 g. of triethylamine and 1.63 g. of (p-ethoxyphenoxy)-2-propanone were hydrogenated in the presence of 0.20 g. of pre-reduced Adams catalyst. Uptake of hydrogen ceased within 17 hr.

The solution was filtered and evaporated to give an oil which was extracted with ether (2× 50 ml.). The ether was evaporated to give a gum which was crystallized from ethyl acetate/cyclohexane to yield a gum which solidified after drying in vacuo for 3 days. Recrystallisation from ethyl acetate/cyclohexane gave 0.30 g. of the product as white prisms, M.P. 98–107°.

EXAMPLE 33

Preparation of $\alpha^1$-(cyclopentylaminomethyl)-4-hydroxy-m-xylene-$\alpha^1,\alpha^3$-diol (a) 5-(N,N-dibenzylglycyl)salicylic acid methyl ester hydrochloride.—24.1 g. of dibenzylamine were added to a solution of 18.5 g. of 5-(bromoacetyl)salicylic acid methyl ester in 500 ml. of ethyl methyl ketone. After being refluxed with stirring for 3 hours the precipitated dibenzylamine hydrobromide was removed. The solution was evaporated to dryness and treated with ether. 2.8 g. of an insoluble solid were removed by filtration and HCl gas was passed through the filtrate to precipitate 22.1 g. of the product. When recrystallised from methanol/ethyl acetate 18.0 g. of a white solid M.P. 174–176° were obtained.

(b) $\alpha^1$-Dibenzylaminomethyl - 4 - hydroxy-m-xylene-$\alpha^1,\alpha^3$ - diol.—10 g. of 5 - (N,N - dibenzylglycyl)-salicylic acid methyl ester hydrochloride were basified with sodium bicarbonate solution and extracted into ether. The ethereal solution was dried over MgSO$_4$ and evaporated. The basic residue in 100 ml. of dry tetrahydrofuran was added to a suspension of 1.74 g. of lithium aluminum hydride in 500 ml. of dry tetrahydrofuran. A white gelatinous precipitate formed which partially dissolved on heating. The stirred mixture was refluxed for 6 hours, then cooled and 5 ml. of water was added dropwise with stirring. The cloudy mixture was evaporated under reduced pressure and the residue was treated with 100 ml. of 5 N hydrochloric acid. The oily hydrochloride which precipitated was separated from the acid solution, washed with a little water and treated with sodium bicarbonate solution. The liberated base was extracted into ether which was dried and evaporated to yield 6.8 g. of the product as a white solid, M.P. 105–107°. Recrystallisation from ether/ light petroleum (B.P. 40–60°) gave 5.7 g. of colourless rods, M.P. 110–111°.

(c) $\alpha^1$-(Cyclopentylaminomethyl)-4-hydroxy-m-xylene-$\alpha^1,\alpha^3$-diol.—3.0 g. of $\alpha^1$-(dibenzylaminomethyl)-4-hydroxy-m-xylene-$\alpha^1,\alpha^3$-diol dissolved in 100 ml. of ethanol and 5 ml. of water were reduced in the presence of 1.0 g. of triethylamine and 1.0 g. of 10% pre-reduced palladium on charcoal catalyst.

Hydrogen uptake ceased after 2.5 hours and 0.76 g. of cyclopentanone was then added and reduction was continued. Owing to slow uptake of hydrogen the catalyst was replaced by 0.5 g. of prehydrogenated Adam's platinum oxide and reduction was completed within 1 hour. After removal of catalyst the solution was evaporated to dryness and the resultant oil was triturated with ether to give 0.9 g. of the cyclopentylamino triol as a white solid, M.P. 121–124°, which was crystallised from ethyl acetate to give a white solid 129–131°.

Preparation of 5-(N-benzyl-N-isopropylglycyl)-salicylic acid hydrobromide monohydrate (a) 5-bromoacetyl-o-anisic acid methyl ester.—1.4 g. of bromine in 10 ml. of chloroform were added dropwise to a stirred solution of 1.7 g. of 5-acetyl-o-anisic acid methyl ester in 50 ml. of chloroform at 0.10°, at a rate which just maintained decolourisation of the bromine. The solution was evaporated under reduced pressure to leave 1.93 g. of the crude bromoacetyl ester as a white solid, M.P. 143–144°. Recrystallisation from methanol gave colourless plates, M.P. 153–154° C.

(b) 5-(N-benzyl-N-isopropylglycyl)-o-anisic acid methyl ester hydrochloride.—A solution of 10 g. of 5-bromoacetyl-o-anisic acid methyl ester and 11.0 g. of benzylisopropylamine in 200 ml. of ethyl methyl ketone was stirred and refluxed for 6.5 hours. The precipitated benzylisopropylamine hydrobromide was filtered off and the filtrate was evaporated to dryness. The residue was triturated with 250 ml. of ether and separated from a little insoluble material, and the ethereal solution was treated with gaseous hydrogen chloride. A brown gum was obtained which crystallised from a mixture of methanol and ethyl acetate to give 6.14 g. of the product as colourless plates, M.P. 194–195°.

(c) 5-(N-benzyl-N-isopropylglycyl)salicylic acid hydrobromide monohydrate.—3.3 g. of 5-(N-benzyl-N-isopropylglycyl)-o-anisic acid methyl ester hydrochloride and 50 ml. of 48% hydrobromic acid were refluxed together for 5 hours. The solution was cooled and filtered to give 2.8 g. of the acid hydrobromide as a white solid M.P. 186.5–188°. Recrystallisation from water and drying at 100°/ 12 mm. gave colourless prisms, M.P. 188–90° C.

(d) 5-(1-hydroxy-2-isopropylaminoethyl)-salicylic acid hydrobromide.—A solution of 2.9 g. of 5-(N-benzyl-N-isopropylglycyl)-salicylic acid hydrobromide in 50 ml. of ethanol was reduced in an atmosphere of hydrogen in the presence of 0.5 g. of 10% palladium on charcoal catalyst. Hydrogen uptake was complete after 23 hours.

The solution after removal of catalyst, was evaporated under reduced pressure to give 2.61 g. of an amber syrup which, when triturated with ethyl acetate and ether, gave 1.95 g. of the product as a white solid M.P. 164–166°.

Recrystallisation from methanol/ethyl acetate gave colourless prisms M.P. 165–166° after being dried at 100°/ 12 mm.

EXAMPLE 35

Preparation of 3-[5-(2-tert-butylamino-1-hydroxy)ethyl-2-hydroxy]phenyl-ethanol (a) 3 - ($\beta$ - acetoxyethyl) - 4-hydroxyacetophenone.—A solution of 15.0 g. of $\beta$-(o-hydroxyphenyl)-ethanol in 120 ml. of 40% w./w. boron trifluoride-acetic acid complex was heated with stirring at 65° for 16 hours, during which time the colour became pale-brown. The solution was cooled and treated with hydrated sodium acetate, then with water, and the mixture was extracted three times with ether. The combined ethereal extracts were dried over anhydrous sodium sulphate and evaporated to give 23 g. of the product as a brown oil.

(b) 4 - acetoxy - 3-($\beta$-acetoxyethyl)acetophenone.—A mixture of 23.0 g. of 3-($\beta$-acetoxyethyl)-4-hydroxyacetophenone, 8.2 g. of acetyl chloride, 46 g. of anhydrous potassium carbonate and 500 ml. of ethyl methyl ketone was refluxed with stirring for 4 hours. The solids were then filtered off and the solvent was evaporated to give an orange oil, which was chromatographed, using 600 g. of silica gel. Eluting with 20% ethyl acetate in benzene gave 15 g. of the required product as a mobile straw-coloured oil.

(c) 4-acetoxy-3-($\beta$-acetoxyethyl)phenacyl bromide.—3.66 g. of bromine in 75 ml. of chloroform was added dropwise, over 70 minutes to a stirred solution of 6.0 g. of 4-acetoxy-3-($\beta$-acetoxyethyl) acetophenone in 75 ml. of chloroform, at room temperature. Stirring was continued for a further 10 minutes then the solution was washed with water and dried over anhydrous sodium sulphate. Evaporation of the solvent gave 7.3 g. of 4-acetoxy-3-($\beta$-acetoxyethyl)phenacyl bromide as a brown oil.

(d) $\beta$-[5-(2-benzyl-tert-butylamino-1-hydroxy)ethyl-2-hydroxy]phenyl ethanol.—4.3 g. of 4-acetoxy-3-($\beta$-acetoxyethyl)phenacyl bromide and 4.1 g. of benzyl tert-butylamine were dissolved in 20 ml. of dry tetrahydrofuran and the solution was left to stand at room temperature for 7 days. Benzyl tert-butylamine hydrobromide was formed and was filtered off. The filtrate was added dropwise over 40 minutes to a stirred suspension of 1.5 g. of lithium aluminium hydride in 30 ml. of tetrahydrofuran. The tetrahydrofuran refluxed gently as the solution was added and a gelatinous solid precipitated.

Stirring was continued for 2 hours at 70°, then the mixture was cooled to 0° and 15 ml. of water was added cautiously to the cold stirred mixture. The mixture was stirred for 1 hour, then dilute hydrochloric acid was added until the mixture was slightly acidic. The pH was adjusted to about 8 by the addition of sodium carbonate solution. The mixture was filtered, and the filtrate was extracted four times with chloroform. The combined chloroform extracts were washed once with water and dried over anhydrous sodium sulphate and the chloroform was evaporated to give 1.8 g. of brown oil.

The oil was refluxed with 500 ml. of light petroleum (B.P. 60–80°) for 10 minutes and the solution was decanted and left to stand at room temperature over-night to give a white solid which was filtered as a first crop.

On treatment with benzene some of the remaining oil dissolved. The solution was decanted, treated with charcoal and evaporated to give 0.8 g. of a pale-brown oil. This was dissolved in ethanol and addition of water gave a whitish solid. Further recrystallization from aqueous ethanol gave a second crop of product as a pure-white solid. The total yield of the product was 265 mg., M.P. 133–134.5° C.

(e) $\beta$ - [5 - (2 - tert - butylamino - 1 - hydroxy)ethyl-2 - hydroxy]phenylethanol. 211 mg. of $\beta$-[5-(2-benzyl-tert - butylamino - 1 - hydroxy-ethyl-2-hydroxy]phenyl-ethanol was hydrogenolysed at room temperature in 30 ml. of ethanol over 10% palladium catalyst on charcoal. Hydrogen uptake ceased in 30 minutes. The catalyst was filtered off and the filtrate was evaporated to give a greenish-yellow oil, which solidified after deep freezing.

The solid, however, could not be recrystallised. 144 mg. of the product, M.P. 54–60°, was obtained.

EXAMPLE 36

Preparation of $\alpha^1$-tert-butylaminomethyl-$\alpha^3$-diphenyl-4-hydroxy-xylene-$\alpha^1,\alpha^3$-diol hydrochloride A solution of phenyl magnesium bromide in ether (45%, 50 ml.; slight excess of ca. 5 mole equivalents) was added in a thin stream to a stirred solution of 5-(2-tert-butylamino - 1 - hydroxyethyl)salicylic acid methyl ester (5.0 g.) in dry tetrahydrofuran (200 ml.). The mixture was refluxed overnight (15 hours), cooled and poured onto ice cold saturated ammonium chloride solution. The organic layer was separated, washed with saturated ammonium chloride solution, dried over sodium sulphate, and evaporated. As thin layer chromatography (silica-cyclohexane-ethyl acetate, 3:1) indicated the presence of a non-basic impurity, the crude oil was dissolved in ethyl acetate (25 ml.) and treated with a slight excess of ethereal hydrogen chloride with cooling. The precipitate was filtered off and dried to give $\alpha^1$-tert-butylamino-methyl - $\alpha^3$ - diphenyl - 4 - hydroxy-m-xylene-$\alpha^1,\alpha^3$-diol, hydrochloride, 6.3 g. (78.3%) M.P. 180–190°, with decomposition.

This material was dissolved in a small amount of tetrahydrofuran, filtered and ethyl acetate (20 ml.) added and allowed to crystallise to afford 4.8 g., M.P. 186–7°, with decomposition.

EXAMPLE 37

Preparation of $\alpha^1$-[(benzyl tert-butylamino)methyl]-4-hydroxy-$\alpha^3$-methyl-m-xylene $\alpha^1,\alpha^3$-diol (a) 4-acetoxy-3-bromoacetophenone.—A solution of 3 - bromo - 4 - hydroxyacetophenone (25 g.) in acetic anhydride (125 ml.) was refluxed for one hour. The excess acetic anhydride was then evaporated, in vacuo to give a brown oil (29.2 g.).

The product was distilled at reduced pressure.

Yield=25.5 g.
B.P.=128–130° at 0.05 mms.

(b) 4'-actoxy-2,3' - dibromoacetophenone.—40 drops of a solution containing bromine (15.8 g.) in chloroform (500 ml.) was added to a stirred solution of 4-acetoxy-3-bromoacetophenone (25.4 g.) in chloroform (800 ml.) which contained 4 drops of hydrobromic acid in acetic acid. A golden-yellow colour was produced and the stirred solution was warmed (40°) for a few minutes. The colour quickly disappeared and the temperature of the stirred solution was maintained at 20–23° while the rest of the bromine solution was added dropwise over 2½ hours.

The solution was washed with water ($\times 4$), dried over magnesium sulphate and evaporated to give a greenish-yellow oil which suddenly crystallised to a cream-coloured solid.

Recrystallisation from ethanol gave the product as a white solid.

Yield=24 g.
M.P.=73–78°

(c) 4' - acetoxy - 3' - bromo - 2 - benzyltert.butyl-amino acetophenone.—A solution of 4' - acetoxy - 2,3'-dibromoacetophenone (8.5 g.) and benzyl, tert-butylamine (8.3 g.) in dry methyl ethyl ketone (120 ml.) was refluxed for 2½ hours. Crystals of benzyl, tert.butylamine hydrobromide were deposited and these were filtered after the mixture had been cooled. Evaporation gave an orange oil which was treated with ether to precipitate more hydrobromide. This was filtered and the ether solution was evaporated to give the product as an orange oil which was used directly, without further purification.

Yield=11.5 g.

(d) α-benzyltertbutylaminomethyl - 3 - bromo-α-hydroxy-p-cresol.—4' - acetoxy-3'-bromo-2-benzyltertbutylaminoacetophenone (11.5 g.) in ethanol (50 ml.) was added dropwise over 5 minutes to a suspension of sodium borohydride (6 g.) in ethanol (70 ml.). The temperature was kept at 30–40° and a vigorous effervescence occurred during the addition. The solution was left to stand at room temperature overnight, then water was added and the ethanol was evaporated. The product was extracted into ether (×10) at pH 12 and the combined ethereal extracts were washed with water, dried over anhydrous sodium sulphate and evaporated to give an orange oil.

Treatment with hot equeous ethanol (charcoal) then cooling gave a crystalline solid, which was recrystallised from aqueous ethanol three times, giving the required product as an off white solid.

Yield=2.3 g.
M.P.=139–140.5

(e) α-[(benzyltertbutylamino)methyl] - 3 - bromo-α-hydroxy-p-cresol.—(1.135 g.) in dry T.H.F. (20 ml.) was added dropwise over 40 minutes under nitrogen to a stirred solution of n-butyllithium in ether (.9 N, 13.8 ml.). An orange, milky precipitate was produced and some heat was given out during the addition. The mixture was gently refluxed for 10 minutes, then left at room temperature for 1 hour.

Acetaldehyde (0.52 g., 4 moles) in ether (15 ml.) was added dropwise, over 5 minutes to the stirred mixture, whereupon most of the solid was dissolved. The solution was further refluxed for 45 minutes then poured into water. Ammonium chloride was added and the product was extracted with ether (three times). The combined ethereal extracts were washed with saturated brine solution, dried over anhydrous sodium sulphate and evaporated on a rotary evaporator, without using heat, to give a brown oil, yield 1.1 g.

Chromatography of 150 mg. of this crude product on silica gave 50 mg. of an oil which failed to crystallise. An NMR of this material indicated that it contained some of the required diol. The doublet at γ 8.6 due to the methyl of the side chain —CH(OH)CH$_3$ was readily identified.

EXAMPLE 38

Preparation of α$^3$-dimethyl-4-hydroxy-α$^1$-isopropylaminomethyl-m-xylene-α$^1$,α$^3$-diol (a) 4-benzyloxy-α$^1$-(N-benzyl - N - isopropylamino)methyl-α$^3$-dimethyl-m-xylene-α$^1$,α$^3$-diol.—A solution of 1.5 g. of 2-benzyloxy-4-[2-N-benzyl,N-isopropylamino-1-hydroxyethyl] benzoic acid, methyl ester in 50 ml. of tetrahydrofuran (50 ml.) was treated with an excess of methyl magnesium bromide in 50 ml. of ether and stirred at room temperature overnight. The mixture was poured on to saturated ammonium chloride solution and the organic layer separated, filtered through cotton wool, and evaporated to dryness to yield a gum.

Trituration of a portion of this gum with dilute hydrochloric acid gave a water insoluble salt, which was recrystallised from tetrahydrofuran-ethyl acetate to give colourless crystals of 4-benzyloxy-α$^1$-(N-benzyl N-isopropylamino)methyl-α$^3$-dimethyl-m-xylene-α$^1$,α$^3$-diol, hydrochloride M.P. 174.5–175°.

(b) α$^3$ - dimethyl-4-hydroxy-α$^1$-isopropylaminomethyl-m-xylene-α$^1$,α$^3$-diol.—A solution of 1.2 g. of 4-benzyloxy-α$^1$-(N - benzyl-N-isopropylamino)methyl-α$^3$-dimethyl-m-xylene-α$^1$,α$^3$-diol in 10 ml. of methanol was added to 0.2 g. of pre-reduced 10% palladium on carbon in 10 ml. of methanol and hydrogenated until uptake of hydrogen ceased. The catalyst was filtered off and the filtrate evaporated to leave 0.9 g. of a pale yellow gum.

The gum was dissolved in ether and treated with an ethereal solution of o-benzoyl benzoic acid to afford 1.08 g. of a crystalline salt M.P. 161–162°.

Recrystallisation from tetrahydrofuran ether gave 0.8 g. of α$^3$-dimethyl - 4 - hydroxy-α$^1$-isopropylaminomethyl-m-xylene-α$^1$,α$^3$-diol, o-benzoyl-benzoate M.P. 162–4°.

EXAMPLE 39

Preparation of 5-{1-hydroxy-2-[(1-methyl-2-phenoxyethyl)amino]ethyl}salicylamide (a) 5-{1-hydroxy-2-[(1-methyl-2-phenoxyethyl)amino]ethyl}salicyclic acid methyl ester.—5-[(2-amino-1-hydroxy)ethyl]salicylic acid methyl ester hydrochloride (2.53 g.) in methanol (60 ml.) was basified by the addition of methanolic sodium methoxide (25 ml. containing 0.24 g. of sodium; 1 mol.) and was added to 1-phenoxy-2-propanone (1.53 g.; 1 mol.; redistilled B.P. 74°/0.7 mm.). The mixture was hydrogenated in the presence of prehydrogenated 10% PdO/C catalyst (1 g.) suspended in methanol (25 ml.). Uptake of hydrogen was complete within 25 hours.

The solution was filtered and evaporated, and the resulting oil was separated from sodium chloride and a trace of unchanged primary amine by washing with water and extracting into ether (150 ml.). The ether was dried [MgSO$_4$] and evaporated to give the crude ester as an oil [2.7 g.].

(b) 5-{1-hydroxy-2-[(1-methyl-2-phenoxyethyl)amino]ethyl}salicylamide.—The crude ester of (a) (2.70 g.) was dissolved in methanol (20 ml.) and ammonia solution d. 0.880 (20 ml.) and allowed to stand in a stoppered flask for five weeks.

The solution was evaporated and the residual oily solid in methanol (7 ml.) was chromatographed on a column of silica (25 g.) in ethyl acetate.

Elution with ethyl acetate gave the following fractions (a) 50 ml. TLC SiO$_2$/MeOH 2 spots R$f$ 0.7 and R$f$ 0.9
(b) 650 ml.: 1 spot R$f$ 0.7
(c) 2 spots R$f$ 0.30 and 0.70

Fraction (b) was evaporated to give a friable solid (ca. 0.60 g.) which was crystallised from benzene to give white crystals of the amide. (260 mg.)$^2$ M.P. 126.5–128.5° C.

EXAMPLE 40

Soluble tablets, suitable for sub-lingual administration, containing 1 ml. of active ingredient, present as the sulphate

| Formula | 1 mg. tablet, mg. | 10,000 tablets, g. |
|---|---|---|
| α$^1$-t-butylaminomethyl-4-hydroxy-m-xylene-α$^1$,α$^3$-diol sulphate | 1.2 | 120.0 |
| Granular mannitol | 87.0 | 870.0 |
| Magnesium stearate | 0.9 | 9.0 |
| Stearic acid | 0.9 | 9.0 |
| Total | 90.0 | 900.0 |

Method

The four ingredients are mixed together, and the mixed powder is compressed on a suitable tablet machine fitted with ¼" normal concave punches, to produce tablets of the correct weight.

EXAMPLE 41

Tablets suitable for oral administration.

| Formula | 1 mg. tablet (as base), mg. | 10,000 tablets, g. |
|---|---|---|
| α$^1$-t-butylaminomethyl-4-hydroxy-m-xylene-α$^1$,α$^3$-diol sulphate | 1.2 | 12.0 |
| Calcium sulphate dihydrate | 88.2 | 882.0 |
| Maize starch | 24.0 | 240.0 |
| Amijel | 6.0 | 60.0 |
| Magnesium stearate | 0.6 | 6.0 |
| Total | 120.0 | 1,200.0 |

Method (1) All the ingredients except the magnesium stearate, are mixed together, the mixed powder are granulated with water, and the damp mass is passed through a 16 mesh screen.

(2) The wet granules are dried, and then passed through a 20 mesh screen.

(3) The dried granules and the magnesium stearate are mixed together and compressed on a suitable tablet machine fitted with ¼" normal concave punches, to produce the required tablets.

EXAMPLE 42

An aerosol formulation, expressed in terms of a single metered dose.

Formula:                                            100 μg. dose
    $\alpha^1$-t-Butylaminomethyl - 4 - hydroxy-m-xylene-
        $\alpha^1,\alpha^3$-diol, μg. ------------------------- 100
    Oleic acid, μg. -------------------------------- 10
    Dichlorodifluoromethane, mg. ------------- 61
    Trichlorofluoromethane, mg. --------------- 24

Method

The active ingredient, the oleic acid and part of the dichlorodifluoro-methane are mixed together. The suspension is then diluted with the remainder of the dichlorofluoromethane, and the requisite quantity is filled into aluminum aerosol containers which are closed by a suitable metering valve. The containers are then pressurised with trichlorofluoromethane.

EXAMPLE 43

Formula:                                            100 μg. dose
    $\alpha^1$-t-Butylaminomethyl - 4 - hydroxy-m-xylene-
        $\alpha^1,\alpha^3$-diol sulphate, μg. ----------------- 120
    Sorbitan trioleate, μg. ---------------------- 120
    Dichlorodifluoromethane, B.P.C., mg. ------- 61
    Trichlorofluoromethane, B.P.C., mg. ------- 24

Method

Mix together the active ingredient, sorbitan trioleate, and part of the dichlorodifluoromethane. The suspension is then diluted with the remainder of the dichlorodifluoromethane, and the requisite quantity is filled into aluminum aerosol containers, which are closed by a suitable metering valve. The containers are then pressurised with trichlorofluoromethane.

EXAMPLE 44

Formula:                                            100 μg. dose
    $\alpha^1$-t-Butylaminomethyl - 4 - hydroxy-m-xylene-
        $\alpha^1,\alpha^3$-diol sulphate, μg. ----------------- 120
    2-dimethylaminoethanol, μg. --------------- 26.6
    Oleic acid B.P. 1963, μg. ------------------- 93.4
    Trichlorofluoromethane, B.P.C., mg. ------- 24
    Dichlorodifluoromethane, B.P.C., mg. ------ 61

Method

The active ingredient, the oleic acid, 2-dimethylaminoethanol and part of the dichlorodifluoromethane. The suspension is then diluted with the remainder of the dichlorodifluoromethane, and the requisite quantity is filled into aluminum aerosol containers, which are closed by a suitable metering valve. The containers are then pressurised with trichlorofluoromethane.

In the above compositions, the amount of active ingredient may be varied widely and the sulphate may be replaced by any other salt having a pharmaceutically acceptable anion.

We claim:

1. A compound of the formula

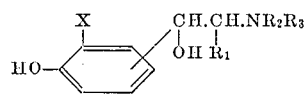

wherein $R_1$ is H or alkyl of 1 to 6 carbon atoms; $R_2$ is H or benzyl; $R_3$ is H, alkyl of 1 to 6 carbon atoms or alkyl of 1–6 carbon atoms substituted by lower alkoxyphenyl or phenoxy; and X is $-CONR_5R_6$ where $R_5$ and $R_6$ are each H, alkyl of 1 to 6 carbon atoms or benzyl, or a physiologically acceptable acid addition salt thereof.

2. The compound of claim 1 which is 5-(2-tert-butylamino-1-hydroxyethyl)-salicylamide.

3. The compound of claim 1 which is 5-(1-hydroxy-2-isopropylaminoethyl)-salicylamide.

4. The compound of claim 1 which is 5-{1-hydroxy-2-[(1-methyl-2-phenoxyethyl)amino]ethyl}salicylamide.

5. The compound of claim 1 which is 5-(1-hydroxy-2-isopropylaminoethyl)-N-methyl salicylamide.

6. The compound of claim 1 which is N-benzyl-5-(1-hydroxy-2-isopropylaminoethyl)salicylamide.

7. The compound of claim 1 which is 5-[1-hydroxy-2-(isopropylamino)-butyl]salicylamide.

8. The compound of claim 1 which is 4-[1-hydroxy-2-(isopropylamino)ethyl]salicylamide.

References Cited

UNITED STATES PATENTS 3,536,712   10/1970   Keck et al. _____ 260—562

HARRY I. MOATZ, Primary Examiner

U.S. Cl. X.R.

260—348 R, 474, 501.1, 519, 570.5 C, 570.7, 592, 623 D; 424—324, 330, 316, 315, 309